United States Patent
Kim et al.

(10) Patent No.: US 10,248,852 B2
(45) Date of Patent: Apr. 2, 2019

(54) METHOD FOR RECOGNIZING FACIAL EXPRESSION OF HEADSET WEARING USER AND APPARATUS ENABLING THE SAME

(71) Applicant: INDUSTRY-ACADEMIC COOPERATION FOUNDATION, YONSEI UNIVERSITY, Seoul (KR)

(72) Inventors: Shiho Kim, Seoul (KR); Jaekwang Cha, Yongin-si (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/686,561

(22) Filed: Aug. 25, 2017

(65) Prior Publication Data

US 2018/0060651 A1 Mar. 1, 2018

(30) Foreign Application Priority Data

Aug. 25, 2016 (KR) .................. 10-2016-0108290

(51) Int. Cl.
*G06K 9/00* (2006.01)
*H04N 5/33* (2006.01)
(Continued)

(52) U.S. Cl.
CPC ..... *G06K 9/00315* (2013.01); *G06K 9/00255* (2013.01); *G06K 9/2018* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,027,619 B2 | 4/2006 | Pavlidis et al. | |
| 2007/0047768 A1* | 3/2007 | Gordon | G06K 9/00255 382/103 |
| 2015/0220807 A1* | 8/2015 | Yang | G06K 9/00288 382/159 |

FOREIGN PATENT DOCUMENTS

| | | |
|---|---|---|
| KR | 10-1317047 B1 | 10/2013 |
| KR | 10-1379373 B1 | 4/2014 |

(Continued)

OTHER PUBLICATIONS

Hao Li et al., "Facial Performance Sensing Head-Mounted Display", ACM Transactions on Graphics TOG—Proceedings of ACM SIGGRAPH, 2015.
(Continued)

*Primary Examiner* — Alex Kok S Liew
(74) *Attorney, Agent, or Firm* — Sughrue Mion, PLLC

(57) ABSTRACT

The present invention discloses an expression recognition apparatus and methods using a head mounted display thereof. A head mounted display apparatus for performing expression recognition according to an embodiment of the present invention comprises a sensing unit including at least one of expression detection sensing units installed inside of said apparatus for sensing expression information around eyes by at least one of a contact or a non-contact manner; an image acquiring unit installed outside of said apparatus for collecting expression information around a mouth; and an acquisition unit for information of expressions for collecting expression information around the eyes and expression information around the mouth.

14 Claims, 16 Drawing Sheets

(51) Int. Cl.
*G06K 9/20* (2006.01)
*G06K 9/46* (2006.01)
*H04N 5/225* (2006.01)

(52) U.S. Cl.
CPC ......... *G06K 9/4661* (2013.01); *H04N 5/2256* (2013.01); *H04N 5/33* (2013.01)

(56) References Cited

FOREIGN PATENT DOCUMENTS

| KR | 10-2016-0036393 A | 4/2016 |
| KR | 10-2016-0052309 A | 5/2016 |

OTHER PUBLICATIONS

Foreign Korean Office Action for KR 10-2016-0108290 dated Jun. 22, 2017.

* cited by examiner

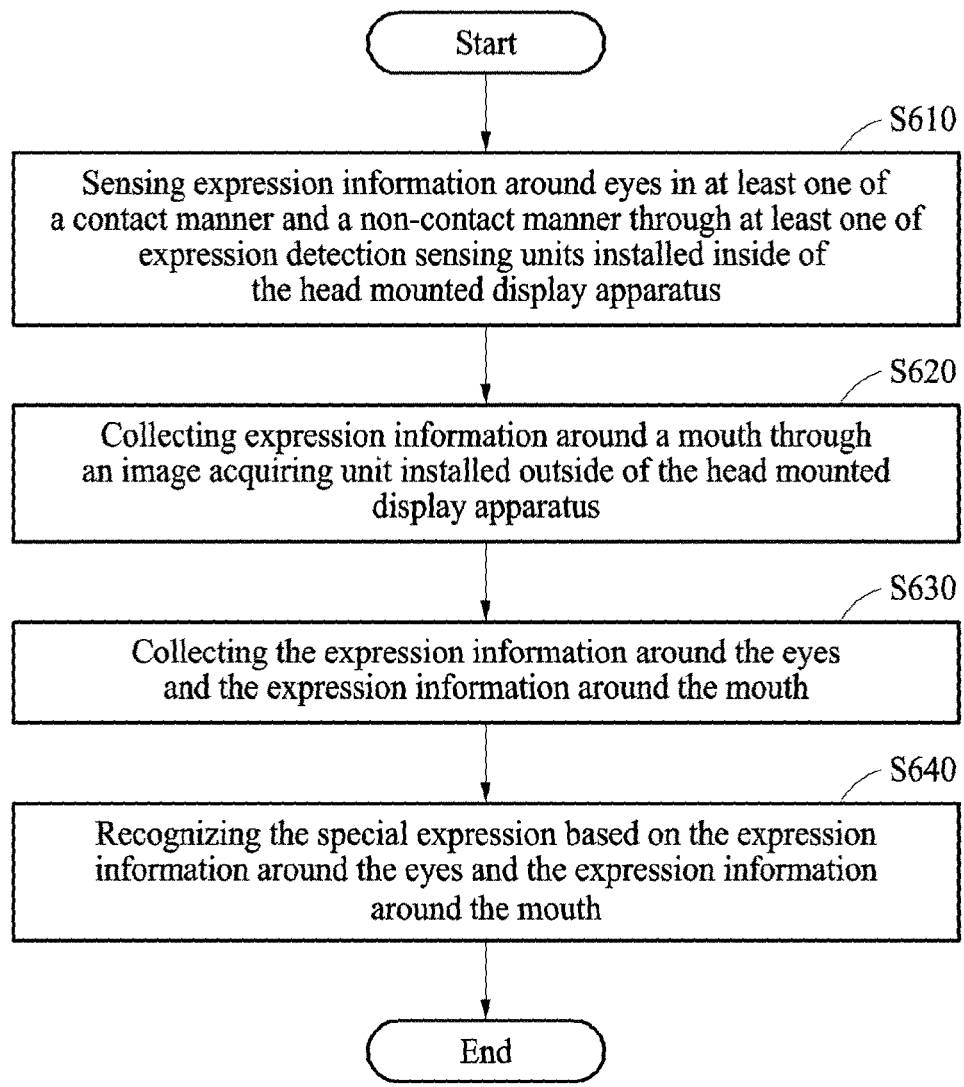

METHOD FOR RECOGNIZING FACIAL EXPRESSION OF HEADSET WEARING USER AND APPARATUS ENABLING THE SAME

CROSS-REFERENCE TO RELATED APPLICATION

This application claims priority to and the benefit of Korean Patent Application No. 10-2016-0108290, filed on Aug. 25, 2016 in the Korean Intellectual Property Office, the disclosure of which is incorporated herein by reference.

BACKGROUND OF THE DISCLOSURE

Field of the Disclosure

The present invention relates to an expression recognition apparatus and a method thereof using a head mounted display.

Description of the Related Art

With the development of computing and display technologies, as a market for smartphones and wearable devices has grown, a virtual reality (VR) market, which has emerged as the core of the future knowledge service industry, is rapidly developing. Accordingly, a head mounted display apparatus, which has been developed to realize virtual reality and military type simulation, is also receiving attention.

In recent years, as head mounted display apparatuses have entered into widespread and as techniques for recognizing expressions or emotions of users using said head mounted display apparatus are introduced, research into more precise expression recognition is required.

Conventional facial or emotional expression recognition technology recognizes an expression of a user by acquiring a face image of a user using a camera, or through a resistance changing in a horizontal direction using a strain sensing unit.

Generally, recognition of emotional expression based on expression information around the eyes and mouth has high accuracy, while recognition of emotional expression based only on expression information of the entire face or partial information around the mouth has low accuracy.

In the case of a user wearing an opaque device such as a mask or a headset, it is impossible to take an image of an expression with an external camera because of an object covering the face.

In the conventional technique using an RGB-D camera, a camera installed in a pipeline connected to a head mounted display apparatus measures an expression around the mouth, which increases the weight of the head mounted display and reduces user satisfaction because the center of gravity is shifted forward of the head mounted display apparatus.

In the conventional technique of using a deformation sensing unit, the deformation sensing unit installed in the head mounted display apparatus may fully recognize the expression of the user by contacting the skin of the user, but cannot fully recognize the expression of a curved part of the face due to difficulty in fully contacting the skin of the user.

Further, the deformation sensing unit has a disadvantage in that difficulty of detecting when the skin surface is deformed in the vertical direction, even detectable when the skin surface is deformed in the horizontal direction.

RELATED DOCUMENTS

Patent Documents

Korean Patent Application Publication No. 2016-0052309 "ELECTRONIC DEVICE AND METHOD FOR ANALYSIS OF FACE INFORMATION IN ELECTRONIC DEVICE"

Korean Patent No. 1317047, entitled "EMOTION RECOGNITION APPARATUS USING FACIAL EXPRESSION AND METHOD FOR CONTROL THEREOF"

U.S. Pat. No. 7,027,619, entitled "NEAR-INFRARED METHOD AND SYSTEM FOR USE IN FACE DETECTION"

Non-Patent Documents

Journal: Hao Li, Laura Trutoiu, Kyle Olszewski, Lingyu Wei, Tristan Trutna, Pei-Lun Hsieh, Aaron Nicholls and Chongyang Ma, 'Facial performance sensing head-mounted display', ACM Transactions on Graphics (TOG)—Proceedings of ACM SIGGRAPH 2015

SUMMARY OF THE DISCLOSURE

An embodiment of the present invention is to provide an expression recognition apparatus and method using a head mounted display that accurately recognizes an expression of a user through a sensing unit installed inside of said apparatus and an image acquiring unit installed outside of said apparatus.

The present invention also relates to an expression recognition apparatus and method using a head mounted display for collecting expression information around the eyes and around the mouth using a sensing unit and an image acquiring unit, and for accurately recognizing a user's expression based on the collected expression information.

In addition, the present invention provides an expression recognition apparatus and method using a head mounted display for accurately recognizing a user's expression by installing a sensing unit at positions corresponding to plurality of feature points around the eyes, wherein the sensing unit serves to measure the difference in infrared diffusion in the horizontal direction and the vertical direction depending on the tensile strength of the skin.

A head mounted display apparatus for performing expression recognition according to an embodiment of the present invention comprises a sensing unit including at least one of expression detection sensing units installed inside of said apparatus for sensing expression information around the eyes in at least one of a contact and a non-contact manner; an image acquiring unit installed outside of said apparatus for collecting expression information around a mouth; and an acquisition unit for information of expressions for collecting expression information around the eyes and the expression information around the mouth.

Said head mounted display apparatus may include an expression recognizer based on the expression information around the eyes and the expression information around the mouth.

Said expression detection sensing unit may include an IR sensing unit having at least one of a contact type light emitter, a contact type light receiver or a non-contact type light receiver.

Said expression detection sensing unit may include an image sensing unit in a near infrared (NIR) band.

Said sensing unit may measure a difference in infrared diffusion in the horizontal direction and the vertical direction depending on the tensile strength of skin through the light emitter and the light receiver.

Said expression detection sensing unit may be installed at positions corresponding to a plurality of feature points around the eyes.

Said image acquiring unit may include a plurality of image acquiring units and the photographing angle of the plurality of image acquiring units may be set in consideration of the acquisition of three-dimensional image information around the mouth.

A head mounted display apparatus for performing expression recognition according to an embodiment of the present invention comprises sensing expression information around the eyes in at least one of a contact and non-contact manner; collecting expression information around the mouth through an image acquiring unit installed outside of the head mounted display apparatus; and collecting the expression information around the eyes and the expression information around the mouth.

Said method of recognizing the expression may include recognizing a specific expression based on the expression information around the eyes and the expression information around the mouth.

Said method of recognizing the expression may include recognizing the expression around the eyes through the IR sensing unit having at least one of a contact type light emitter, a contact type light receiver and a non-contact type light receiver.

Said method for recognizing the expression may include a step of recognizing expression information around the eyes through an image sensing unit in the near infrared (NIR) band.

Said method of recognizing the expression may include a step of measuring a difference in infrared diffusion in the horizontal direction and the vertical direction depending on the tensile strength of the skin through the light emitter and the light receiver.

Said method of recognizing the expression may include recognizing the expression around the eyes through an expression recognition sensing unit installed at positions corresponding to a plurality of feature points around the eyes.

Said method for recognizing the expression may include a plurality of image acquiring units and the photographing angle of the plurality of image acquiring units may be set considering the acquisition of three-dimensional image information around the mouth.

According to the embodiment of the present invention, since the head mounted display apparatus recognizes the expression of the object based on the expression information around the eyes and the expression information around the mouth using the expression detection sensing unit and the camera, recognition speed and accuracy can increase more than in the technique of recognizing the expression using only the camera image or partially covered face status.

BRIEF DESCRIPTION OF THE DRAWINGS

The above and other objects, features and other advantages of the present invention are more clearly understood from the following detailed description taken in conjunction with the accompanying drawings, in which:

FIG. 6 is a flowchart illustrating an expression recognition process of the head mounted display apparatus according to an embodiment of the present invention.

DETAILED DESCRIPTION OF THE DISCLOSURE

Hereinafter, embodiments of the present invention will be described in detail with reference to the accompanying drawings and the accompanying drawings, but the present invention is not limited to or limited by the embodiments.

The terminology used herein is for the purpose of illustrating embodiments and is not intended to be limiting of the present invention. In this specification, the singular forms include plural forms unless specifically stated in the text. The terms "comprises" and/or "comprising" specify that the presence of stated elements, steps, operations, and/or components do not preclude the presence or addition of one or more other elements, steps, operations, and/or components.

As used herein, the terms "embodiment," "example," "side," and the like should not be construed as advantageous or advantageous over any other aspect or design.

Also, the term 'or' means 'inclusive or' rather than 'exclusive or'. That is, unless expressly stated otherwise or clear from the context, the expression 'x uses a or b' means any of the natural inclusive permutations.

Furthermore, the singular presentation ("a" or "an") used in the specification and claims should be construed to generally mean "one or more", unless the context clearly dictates otherwise.

Unless defined otherwise, all terms (including technical and scientific terms) used herein may be used in a sense that is commonly understood by one of ordinary skill in the art to which this invention pertains. In addition, commonly used predefined terms are not ideally or excessively interpreted unless explicitly defined otherwise.

In the following description of the present invention, a detailed description of known functions and configurations incorporated herein will be omitted when it may make the subject matter of the present invention rather unclear. The terminology used herein has been selected to appropriately express embodiments of the present invention, which may vary depending on the user, the intention of the operator, or the practice of the field to which the present invention pertains. Therefore, the definitions of these terms should be based on the contents throughout this specification.

Figure 1:
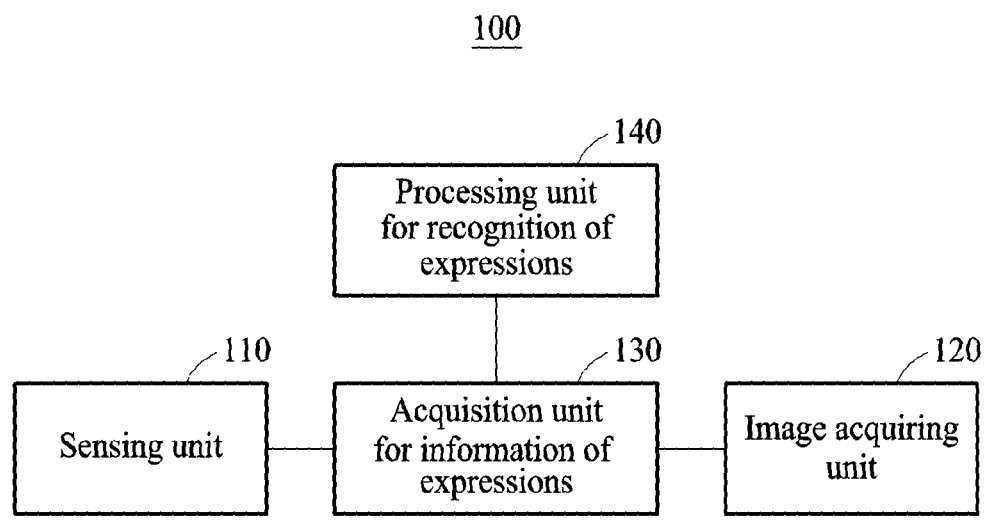
FIG. 1 illustrates a block diagram of a head mounted display apparatus according to an embodiment of the present invention.

FIG. 1 shows a block diagram of a head mounted display apparatus according to an embodiment of the present invention.

Referring to FIG. 1, the head mounted display apparatus 100 according to an embodiment of the present invention includes a sensing unit 110, an image acquiring unit 120, an acquisition unit for information of expressions 130, and an expression recognition processor 140.

The sensing unit 110 includes at least one expression detection sensing unit installed inside of said apparatus 100 for sensing expression information in the area around the eyes in at least one of a contact manner and a non-contact manner.

The expression detection sensing unit according to an embodiment may include at least one of an IR sensing unit having a light emitter and a light receiver, a biological sensing unit, a human body sensing unit, an image sensing unit, or an EMG sensing unit.

According to the embodiment, the expression detection sensing unit may include a light emitter and a light receiver.

The light emitter and the light receiver according to the embodiment may operate in a contact manner in which the light emitter and the light receiver are in contact with any one object (e.g., the skin).

The light emitter may emit infrared light contacting said any one object.

The infrared light emitted from the light emitter is transmitted to the light receiver after being diffused by the object. The light receiver may detect the transmitted infrared light using a photodiode contacting in said any one object.

In another embodiment, the expression detection sensing unit may include a light emitter and an image sensing unit operating in a non-contact manner.

The light emitter may emit infrared light in contact with any one object. In addition, the image sensing unit may sense aspects in which the emitted infrared light is transmitted through said any one object.

According to one embodiment, the expression detection sensing unit may include an image sensing unit of a near-infrared (NIR) band in a non-contact manner.

The image sensing unit may have a predetermined distance or more from any one object in a non-contact manner.

The sensing unit 110 may include a light emitter, a light receiver, and an image sensing unit.

Here, the light emitter may contact any one object. The light receiver may include a photodiode contacting any one object. The image sensing unit may measure a difference in infrared diffusion in the horizontal direction and the vertical direction depending on the tensile strength of the skin, without contacting any one object.

According to an embodiment, the light emitter may be attached to any one of the objects and emit infrared light to any one of the objects (e.g., skin). In addition, the emitted infrared light diffuses horizontally and vertically at the skin surface of the object.

In addition, the light emitter according to the embodiment is configured with an infrared LED (Light Emitting Diode). For example, the light emitter is composed of an infrared LED module including a plurality of infrared LEDs. The LED may include at least one of an OLED (Organic Light Emitting Diode), an AMOLED (Active Matrix Organic Light Emitting Diode), and a FLED (Flexible LED).

The changing of the tensile strength of the skin measured by the expression detection sensing unit according to the embodiment may indicate the changing of degree of compression and degree of stretching of any one object.

For example, the light emitter and the light receiver may measure the reference value of compression and stretching of any one object.

In addition, the expression detection sensing unit may measure the reference value of the degree of compression and stretching measured by any one of the light emitter and the light receiver.

In other words, said expression detection sensing unit may measure the tensile strength of compression of any one object in consideration of the measurement result of the reference value.

For example, if any one object is located equidistant between the light emitter and the light receiver, and the infrared intensity value measured by the light emitter and the light receiver is smaller than the reference value, said expression detection sensing unit may determine that the tensile strength of said object is compressed.

In another example, if an object is located equidistant between the light emitter and the light receiver, and the infrared intensity value measured by the light emitter and the light receiver is greater than the reference value, said expression detection sensing unit may determine that the tensile strength of said object is stretched.

In addition, at least one of the expression detection sensing units according to the embodiment may be installed at positions corresponding to a plurality of feature points around the eyes.

The feature points are preset special positions to distinguish between the position of the face and the eye for expression recognition.

For example, the feature points are positions necessary to recognize an expression around the eyes or a specific point indicating blinking of the eyes, wrinkles around the eyes, movement of flesh under the eyes, and position of the eyelids.

In the prior art, the deformation detection sensing unit recognizes an expression by measuring the expression around the user's eyes fully contacting the user's face, in contrast, according to the present invention, the sensing unit 110 including one or more expression detecting sensing units may measure the expression information around the eyes in a contact and non-contact manner with the user's face.

According to an embodiment, an expression around the eyes of object may be measured through the expression detection sensing unit including an IR sensing unit having a light receiver using a photodiode in the contact manner.

According to one embodiment, the IR propagation pattern on any one object may be measured through the expression detection sensing unit including the image sensing unit.

The image sensing unit may measure a pattern of IR propagation that indicates an aspect in which the infrared light emitted from the light emitter contacting the object is diffused horizontally or vertically in the skin.

For example, an image sensing unit (e.g., a camera) may photograph a pattern of IR propagation for the case of no-compression or no-stretching of the object.

For this purpose, the image sensing unit may measure a pattern of IR propagation having a contour shape, in which a plurality of concentric circles having a circular shape is gradually disposed from a light source positioned at the center.

The image sensing unit (for example, a camera) may photograph a pattern of IR propagation for the case of compression of the object.

For this purpose, the image sensing unit may measure a pattern of IR propagation having a contour shape, in which a plurality of ellipses, which has an elliptical shape in a direction different from a direction to which the compressive force is applied in both sides of the circle from the outside of the circle, is gradually disposed from a light source positioned at the center.

The image sensing unit may photograph a pattern of IR propagation for the case of stretching of object.

For this purpose, the image sensing unit may measure a pattern of IR propagation having a contour shape, in which a plurality of ellipses, which has an elliptical shape in both directions to which a tensile force of a circle is applied, is gradually disposed from a light source positioned at the center.

The pattern of the IR propagation may be an expression information around an eye of an object.

The image acquiring unit 120 may collect images including the expression information around the mouth.

According to an embodiment, the image acquiring unit 120 may include a plurality of image acquiring units. The photographing angle of the plurality of image acquiring units may be set in consideration of acquiring three-dimensional image information around the mouth.

Further, the image acquiring unit may include a camera. For example, in order to obtain three-dimensional image information, a plurality of cameras may be installed at lower portions outside of the head mounted display apparatus 100.

According to an embodiment, the image acquiring units including the camera for photographing still images or video include one or more of an image sensing unit, a lens, an ISP (Image Signaling Processor), and a flash. In addition, the image acquiring unit may magnify and focus on a specific portion in order to photograph a specific part of the image in detail.

According to one embodiment, the image acquiring unit 120 may be installed at positions including a plurality of feature points around the mouth.

The plurality of feature points around the mouth may be predetermined set positions.

For example, the feature points are predetermined specific points to distinguish the state of the mouth for recognizing expression such as the position of the mouth necessary for recognizing the expression around the mouth, the movement of the mouth, the position of the lip when the mouth is opened and the mouth is closed, the position of the mouth angle, and the size of the mouth.

The information collector 130 collects the expression information around the eyes said sensed and the expression information around the mouth said collected.

According to the embodiment, the head mounted display apparatus 100 may include an expression recognition processor 140 for recognizing expressions based on expression information around the eyes and the expression information around the mouth.

The expression recognition processor 140 may recognize the expression information of the user wearing the head mounted display apparatus 100 by extracting the expression information based on the collected expression information around the eyes and the mouth by using a sensing unit 110 including at least one expression detection sensing unit and an image acquiring unit 120 including the plurality of image acquiring units.

According to one embodiment, the expression recognition processor 140 may recognize the expression of the user by combining the expression information around the eyes and the expression information around the mouth. For example, when the user closes his or her eyes, the expression of closing the eyes may be an expression representing extreme joy or extreme fear. Therefore, the expression recognition processor 140 may recognize the expression of closing the eyes through the collected expression information around the eyes, and recognize the expression information of the mouth portion including a state in which the mouth is opening, or a state of in which the mouth is closing by combining the expression information around the mouth of the user. Accordingly, the processor may precisely recognize the expression of the user by determining whether the user is closing the eyes and opening the mouth in extreme joy, or user is closing the eyes and closing the mouth in extreme fear.

According to one embodiment, the expression recognition processor 140 can check the resolution, image size, and white balance around the mouth image recognized by the expression information around the mouth.

In addition, the expression recognition processor 140 synchronizes the recognized image with the previously captured image.

For example, if the recognized around the mouth image is not similar to any one of the previously captured images, such as resolution, image size, and white balance depending on weather, lighting, and indoor/outdoor conditions, said processor 140 may synchronize the resolution, image size, and white balance of the recognized image with previously captured images.

In addition, the head mounted display apparatus 100 may include a module calculating a value of white balance. If the white balance of the recognized around the mouth image is not similar to the white balance of the previously captured image, said white balance calculating module may find the value of the white balance of the previously captured image, and apply the calculated white balance value to the recognized around mouth image.

According to one embodiment, the expression recognition processor 140 recognizes expression change of a user by searching the expression information patterns using a machine learning function based on the expression information around the eyes and the expression information around the mouth.

According to one embodiment, the expression recognition processor 140 may include an expression recognition algorithm to find the expression information patterns.

The expression recognition algorithm detects the eye region, a line connecting the feature points around the eye and the mouth, a line bisecting the vertical bisector, and whether said vertical bisector matches a position in the center of the mouth by the infrared intensity difference information, but the algorithm is not limited thereto.

According to one embodiment, the expression recognition processor 140 recognizes the expression information around the eyes using the infrared light changing value according to the tensile strength changing of the skin surface of the object measured by the expression detection sensing unit.

In addition, the expression recognition processor 140 recognizes the expression information around the mouth collected by the image acquiring unit.

In addition, the expression recognition processor 140 may combine the expression information around the eyes and the expression information around the mouth.

According to an embodiment, the expression recognition processor 140 maps a change in tensile strength measured by the expression detection sensing unit to a coordinate of any one object, extracts an expression information pattern of the object from the mapping, finds a pattern similar to the expression information pattern, and recognizes the expression of the object.

According to an embodiment, the expression recognition processor 140 may combine the expression information around the eyes with the expression information around the mouth, and recognizes the expression by comparing the combined information with the accumulated pattern. In addition, the accumulated pattern may be stored expression pattern information generated based on the detected infrared light. In addition, the combined information may be stored in the accumulated pattern.

According to one embodiment, the combination of the expression information around the eyes and the expression information around the mouth recognized by the expression recognition processor 140 may be transmitted to the external electronic device through the wireless communication network. The external electronic device may determine an expression pattern by comparing said combined information with the stored expression pattern information. The expression pattern result determined by the external electronic device may be transmitted to the head mounted display apparatus 100 using the wireless communication network. The expression information recognition processor 140 recognizes an expression based on the expression pattern result.

According to one embodiment, the head mounted display apparatus 100 may share the infrared light changing values in tensile strength of skin surface of at least one of the objects with at least one external electronic device. In addition, the external electronic device can determine the expression information pattern based on the infrared change value.

According to one embodiment, the head mounted display apparatus 100 may include a wireless Internet module to transmit the information obtained through combination of the expression information around the eye and the expression information around the mouth recognized by the expression recognition processor 140, or the changing values of the infrared light according to the change in tensile strength of the skin surface of the object, to the external electronic device.

For example, the wireless Internet module is a module for wireless Internet access, and the wireless Internet module includes modules based on WLAN (wireless WLAN) (Wi-Fi), WiBro (wireless broadband), WiMAX (World Interoperability for Microwave Access), HSDPA (High speed Downlink Packet Access) and LTE technology.

In addition, the external electronic device may include a wireless Internet module to transmit expression pattern results to the head mounted display apparatus 100.

In addition, the head mounted display apparatus 100 may include a user interface or an application, and may provide an interface.

Figure 2:
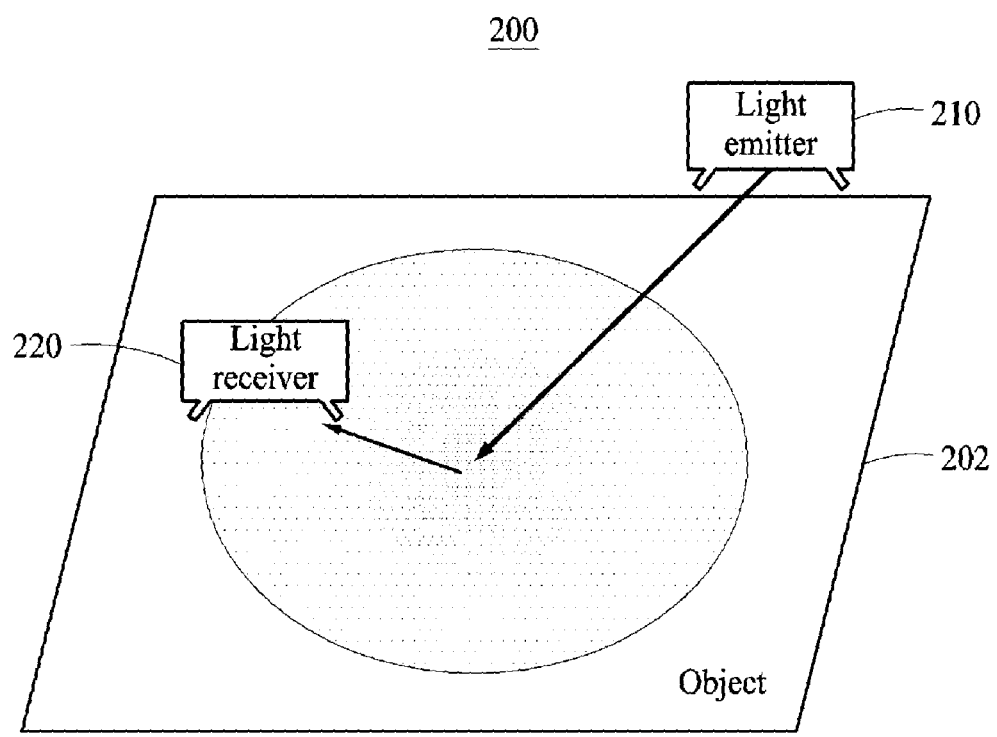
FIG. 2 illustrates a process of transmitting and receiving infrared light varying according to tensile strength of the skin through a light emitter and a light receiver of the head mounted display apparatus according to an embodiment of the present invention.

FIG. 2 illustrates a process for transmitting and receiving infrared light varying related to skin tensile strength through a light emitter and a light receiver of a head mounted display apparatus according to an embodiment of the present invention.

FIG. 2 illustrates the infrared light transmission/reception operation including information for recognizing an expression of an object 202 using a light emitter 210 and a light receiver 220.

Referring to FIG. 2, infrared light is emitted to an object 202 from a light emitter 210 contacting or attached to any one object (e.g., skin), and the infrared light is diffused and transmitted through the object 202, and a light receiver 220 including a photodiode receives the infrared light diffused and transmitted from the object.

For example, the object 202 may be the skin surface of a user wearing the head mounted display apparatus. In addition, the skin surface of the user may be a portion around the eyes covered with the head mounted display apparatus.

In addition, the condition of user's skin surface may change in thickness, density or physical state by compression, stretching, or any kind of internally or externally applied tensile strength.

The light receiver 220 may receive the infrared light diffused and transmitted from the object 202 in a non-contact manner or a contact manner in the skin surface of the user.

In addition, the light receiver 220 contacting the skin surface of the user may include a photodiode. For example, the infrared light emitted from the light emitter 210 contacting the skin surface of the user is diffused and transmitted at the skin surface, and the diffused and transmitted infrared light is detected by the light receiver 220 including the photodiode.

According to one embodiment, the non-contact light receiver 220 that is not in contact with the user's skin surface may include an image sensing unit. For example, the image sensing unit may detect an aspect of infrared light diffused and transmitted away from a user's skin surface at a predetermined distance or more.

According to one embodiment, the light receiver 220 may recognize the expression by the infrared intensity information diffused and transmitted varying according to the skin density and the skin tensile strength of the object 202.

According to one embodiment, at least one light receiver 220 may detect the infrared intensity information including the difference in the intensity of infrared light, emitted from the light emitter 210, and diffused and transmitted according to the physical state of the skin surface of the object 202. For example, the physical state of the skin surface is changed by wrinkles and dimples generated as an expression. The changed physical state of skin surface causes the difference in intensity of the diffused and transmitted infrared light. At least one light receiver 220 recognizes said changing intensity of the infrared light and recognizes the expression.

According to an embodiment, the plurality of light emitters 210 and the plurality of light receivers 220 may be configured as a pair and the infrared intensity information according to the distance between the light emitter 210 and the light receiver 220 may be measured. For example, when the distance between the light emitter 210 and the light receiver 220 is a specific distance (for example, 1 to 2 mm), the intensity values of the infrared light may decrease.

One of the plurality of light emitters 210 contacting the skin surface of the object 202 and one of the plurality of light receivers 220 contacting the skin surface of the object 202 are configured as a pair.

According to one embodiment, one of the plurality of light emitters 210 contacting the skin surface of an object 202 and one of the plurality of image sensing units not contacting skin surface of the object 202 are configured as a pair.

According to one embodiment, the infrared light emitted from the light emitter 210 may be infrared light in a horizontal direction or a vertical direction. The infrared light emitted from the light emitters 210 may be diffused in the horizontal direction on the skin surface of the object 202.

In addition, the infrared light emitted from the light emitter 210 may be reflected, refracted, diffused, transmitted, and absorbed after being horizontally diffused by the object.

According to one embodiment, the light emitter 210 emits the infrared light of the z-axis direction toward the object 202, and the emitted infrared light propagates to a fat layer located under the object in the x-axis direction and the y-axis direction, and the infrared light transmitted in the x-axis direction and the y-axis direction may exhibit exponential properties.

For example, the head mounted display apparatus recognizes the wearing user's expression by determining change in the propagation characteristics of the infrared light and mapping the changed propagation characteristics of the infrared light emitted toward the object 202.

In addition, according to one embodiment, a sensing unit module including a light emitter and a plurality of light receivers may be provided, and a plurality of sensing unit modules may be provided. The plurality of sensing units may be configured to have a phase difference of infrared light, respectively, so that interference or distinction between the sensing unit modules can be easily set. In addition, the transmission and reception signals between the sensing unit modules may be easily distinguished by changing the frequency and the pulse rate of the infrared light as well as the phase difference.

Figure 3:
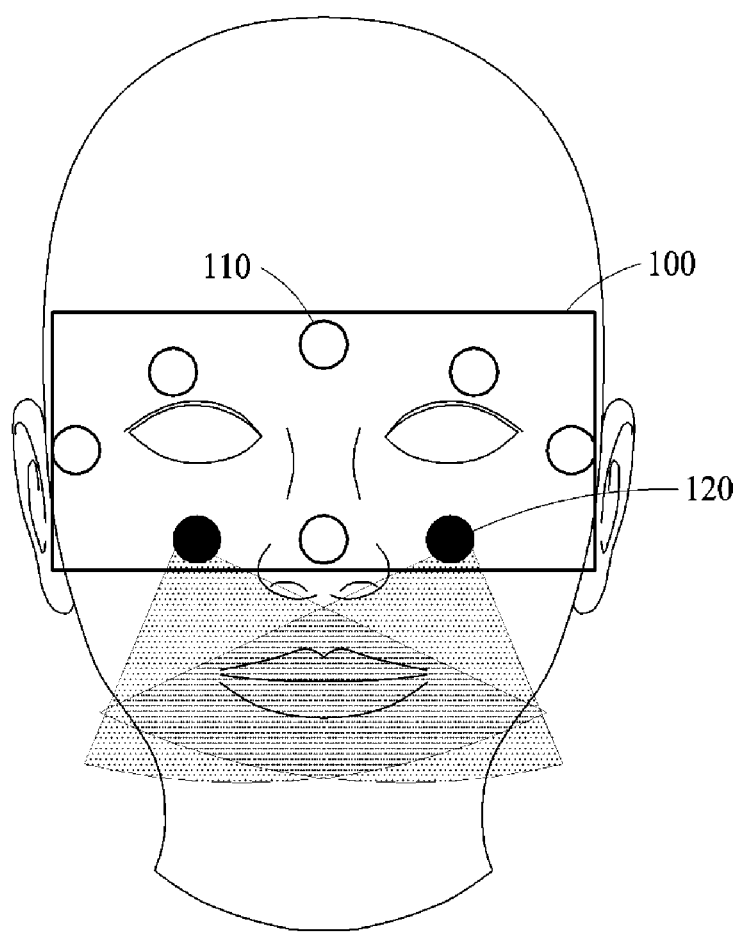
FIG. 3 illustrates an arrangement of a sensing unit and an image acquiring unit of the head mounted display apparatus for recognizing an expression according to an embodiment of the present invention.

FIG. 3 shows an arrangement of sensing units and image acquiring units of the head mounted display apparatus for recognizing an expression according to an embodiment of the present invention.

Referring to FIG. 3, the sensing unit (110) of said apparatus covers the surrounding area of the wearer's face when the head mounted display apparatus is worn. The sensing unit 110 is installed inside of said apparatus 100 in order to recognize the expression of the user's eyes. In addition, the image acquiring unit 120 may be installed outside of said apparatus 100 to recognize an expression of the user's mouth.

The head mounted display apparatus 100 has a wearable form on the user's head. The head mounted display apparatus 100 may take the form of glasses. The apparatus 100 may be temporarily fixed to the head of the user by a frame.

The sensing unit 110 may include at least one infrared light sensing unit for recognizing the expressions, and said IR sensing unit may be located in correspondence to a feature point for recognizing the expression around the eyes.

The sensing unit 110 may include a light emitter and a light receiver as a pair.

For example, the light emitter and the light receiver may be installed inside the wearable headset apparatus 100 in a pair with a distance.

According to one embodiment, the sensing unit 110 may include a plurality of light emitters installed inside of said apparatus 100 and a plurality of light receivers arranged at positions corresponding to the feature points.

Components included in the head mounted display apparatus 100 are not limited to those shown in FIG. 3. The sensing unit 110 and the image acquiring unit 120 may be mounted at more positions than shown in FIG. 3.

The image acquiring unit 120 may include at least one camera and may be installed to acquire three-dimensional expression information at a lower portion outside of the head mounted display apparatus 100.

Figure 4:
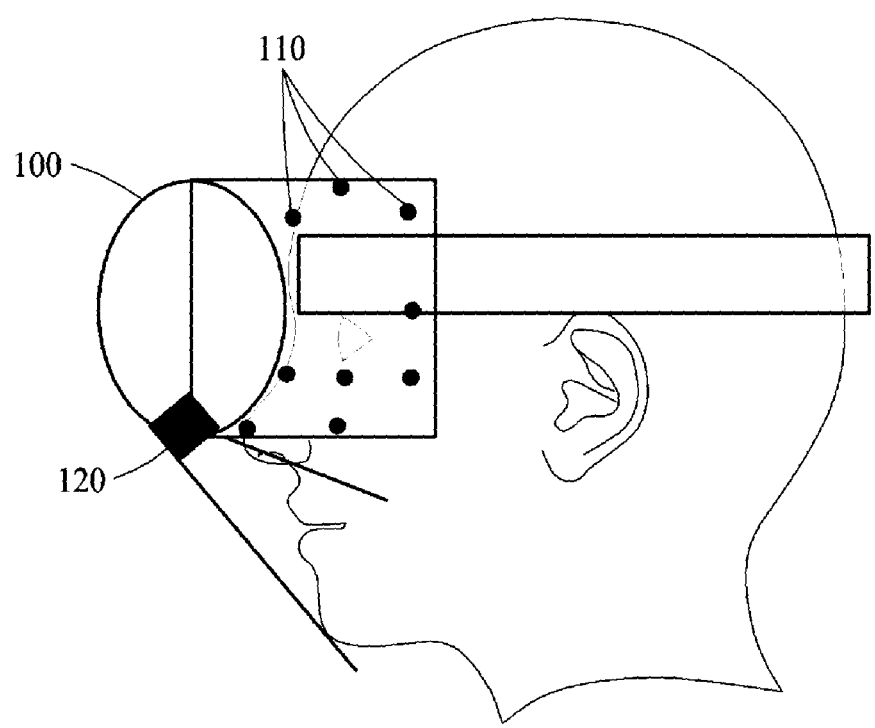
FIG. 4 is a side view showing an arrangement of sensing units and an installation angle of the image acquiring unit of the head mounted display apparatus for recognizing an expression according to the embodiment of the present invention.

FIG. 4 is a side view showing the arrangement of sensing units and the installation angle of the image acquiring unit of the wearing type apparatus for recognizing expressions according to the embodiment of the present invention.

Referring to FIG. 4, a sensing unit 110 and an image acquiring unit 120 to recognize the expression of a user wearing the apparatus 100 are disposed.

For example, a sensing unit 110 including at least one IR sensing unit may be disposed at a position corresponding to a feature point for recognizing the user's expression around the eyes.

In addition, the image acquiring unit 120 including a plurality of cameras may be disposed at a position and an angle including the feature points for recognizing the user's expression around the mouth and obtaining hemispherical image.

The positions of the sensing unit 110 for recognizing the expression around the eyes and the image acquiring unit 120 for recognizing the expression around the mouth are not limited to those shown in FIG. 4.

The sensing unit 110 for recognizing the expression around the eyes and the image acquiring unit 120 for recognizing the expression around the mouth may be disposed at some position different from the position shown in the head mounted display apparatus 100.

For example, the image acquiring unit 120 for recognizing the three-dimensional expression information around the mouth may be positioned at both ends of the lower portion outside of the head mounted display apparatus 100.

At least one IR sensing unit included the sensing unit 110 may include a light emitter and a light receiver and may be installed in the head mounted display apparatus 100.

In addition, the plurality of light emitters may emit sequentially, simultaneously, and at near the feature points the infrared light to the skin surface of the object.

For example, the plurality of light emitters sequentially and simultaneously emits light near the feature points the infrared light to the skin surface of the object, the emitted infrared light is diffused horizontally by the skin surface of the object. The diffused infrared light is detected as the infrared light having different intensity at each point of the skin surface depending on the difference in skin tensile strength.

The plurality of light receivers may sense intensity of the infrared light at respective points on the surface of the skin.

Figure 5:
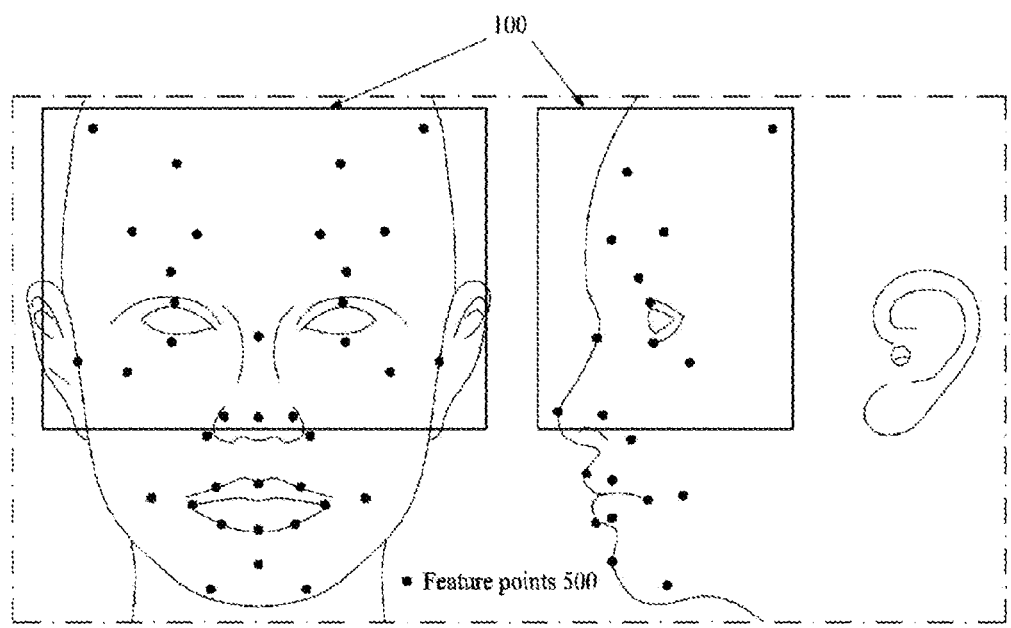
FIG. 5 shows feature points for recognizing expressions of the head mounted display apparatus according to an embodiment of the present invention.

FIG. 5 shows the feature points for the expression recognition of the head mounted display apparatus according to an embodiment of the present invention.

Referring to FIG. 5, the feature points 500 arranged to recognize expression around the eyes and around the mouth may be preset.

The light receiver of the IR sensing unit installed in the head mounted display apparatus 100 recognizes the intensity of the infrared light reflected from the predetermined feature point 500 according to the embodiment.

For example, if the density of the object is low, the intensity of the infrared light is recognized to be lower than the reference value, and if the density of the object is high, the intensity of the infrared light is recognized to be higher than the reference value.

The expression of the user may be recognized based on the infrared intensity information reflected from the feature point 500.

FIG. 6 is a flowchart illustrating the expression recognition process of the head mounted display apparatus according to an embodiment of the present invention.

Referring to FIG. 6, in step S610, at least one expression detection sensing unit installed inside of the head mounted display apparatus may detect the expression information around the user's eyes.

The at least one expression detection sensing unit may include an IR sensing unit.

For example, the expression detection sensing unit which is composed of a light emitter and a light receiver is installed inside of the head mounted display apparatus may detect the infrared intensity information according to the measured variations of compression, stretching, thickness, density, tensile strength, or physical state of the skin surface from the user's expression.

For example, if the surface of the skin is compressed, the intensity of infrared light is high, otherwise if the surface of the skin is stretched, the intensity of infrared light is low. In addition, if the density of the skin surface is high-density, the intensity of the infrared ray is detected high, and if the density of the skin surface is low-density, the intensity of the infrared ray is sensed low.

In step S620, a plurality of image acquiring units provided outside of the head mounted display apparatus collects the expression information around the user's mouth.

The plurality of image acquiring units may include a camera, which is installed at lower portion outside of said apparatus and can adjust the direction of input angle to acquire a wide range of input image in a stationary position of the camera.

can adjust the direction of input angle to acquire a wide range of input image in a stationary position of the camera For example, a plurality of image acquiring units may acquire three-dimensional images. For this purpose, the angle of the image acquiring unit may be adjusted. Further, each of the plurality of image acquiring units may be installed with angles including all the preset feature points around the mouth.

The feature points may be located within an overlapping viewing angle when a plurality of cameras installed outside of the head mounted display apparatus may acquire the images around the mouth.

In step S630, the detected expression information of around the eyes and the collected expression information of around the mouth are acquired.

The detected expression information of around the eyes and the collected expression information of around the mouth may include the infrared intensity information and the expression information of around the mouth.

The infrared intensity information may be sensed on the surface of the skin corresponding to the feature points arranged in the preset user's face, and may be changed according to the intensity of the infrared light.

In addition, the expression image around the mouth may be recognized through the three-dimensional image information around the mouth acquired from a plurality of cameras.

Then, in step S640, the specific expression information is recognized based on the expression information around the eyes and the expression information around the mouth.

The expression of the user may be recognized by searching the pattern representing the specific expression based on the collected expression information around the eyes and expression information around the mouth.

For example, certain expression information may be distinguished by expression patterns of laughter, sadness, surprise, anger, fear, disgust, fear, joy, happiness, and expressionless according to the kind of user expression, and the distinguished expression pattern may be recognized as the user's expression.

Figure 7A:
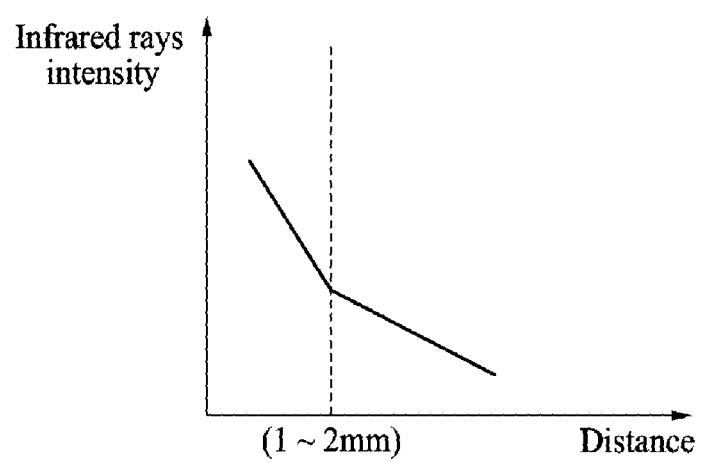
FIGS. 7A and 7B are graphs illustrating infrared intensity information transmitted through a light emitter and a light receiver of the head mounted display apparatus according to an embodiment of the present invention.
Figure 7B:
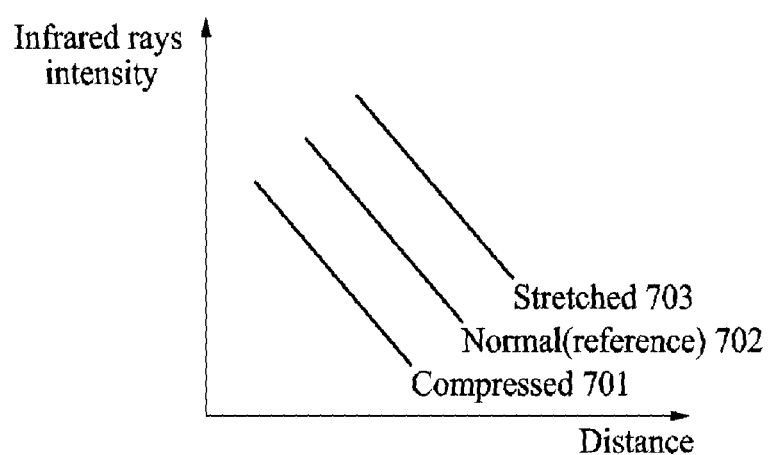

FIGS. 7A and 7B are graphs illustrating infrared intensity information transmitted through a light emitter and a light receiver of the head mounted display apparatus according to an embodiment of the present invention.

FIG. 7A is an example of a graph representing change in infrared intensity information according to a distance between a light emitter and a light receiver.

FIG. 7B is an example of a graph showing the infrared intensity information, which is emitted from the light emitter, transmitted to the light receiver according to the state of the object.

Referring to FIG. 7A, a graph representing variation in the intensity information of the infrared light according to the distance between the light emitter and the light receiver is composed of a horizontal axis representing distance and a vertical axis representing intensity information of the infrared light received by the light receiver. In this case, the vertical axis has a logarithmic scale.

As the distance between the light emitter and the light receiver increases, the light intensity of the infrared light received by the light receiver decreases exponentially.

The intensity information of the infrared light received by the light receiver has a similar shape to an exponential function according to the distance between the light emitter and the light receiver. For example, when the distance between the light emitter 210 and the light receiver 220 is a specific distance (for example, 1 to 2 mm), the intensity information of the infrared light may decrease.

Referring to FIG. 7B, the horizontal axis represents the distance between the light emitter and the light receiver, and the vertical axis represents the intensity information of the infrared light emitted from the light emitter and received by the light receiver. In this case, the vertical axis may have a logarithmic scale.

When the light intensity of the infrared light received by the light receiver is lower than the Normal(reference) 702, this represents Compressed 701 of the object and when the light intensity is higher than the Normal(reference) 702, this represents Stretched 703 of the object.

According to one embodiment, the head mounted display apparatus may decide the degree of compression or stretching of skin by mapping the information of the Compressed 701 or the Stretched 703 of the object to the corresponding region of one object on the coordinates.

According to one embodiment, the head mounted display apparatus recognizes the user's expression in real time by determining the degree of skin compression and stretching of the user.

FIGS. 8A to 8D show examples of expression recognition through the expression around the mouth on the head mounted display apparatus according to the embodiment of the present invention.

Figure 8A:
FIGS. 8A to 8D show examples of expression recognizing of head mounted display apparatus through the expression information around the mouth according to the embodiment of the present invention.
Figure 8B:
Figure 8C:
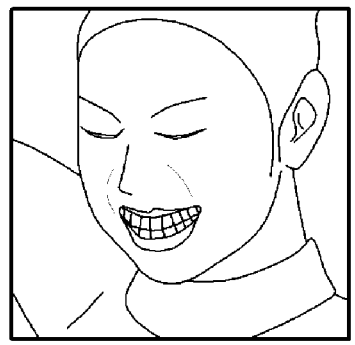
Figure 8D:

FIGS. 8A, 8C and 8D illustrate the expression around the mouth of a person who closes their eyes and FIG. 8B illustrates the expression of a person who opens their eyes.

FIGS. 8A, 8C, and 8D represent the user's closed eyes. However, the accurate expression is not recognized only by the expression information around the eyes due to the difficulty in decision of whether the user closes the eyes due to fear or happiness. In this case, an accurate expression is recognized by additional the expression information around mouth.

For example, FIG. 8A represents a gentle expression with closed eyes and almost closed mouth. FIG. 8C represents a happy expression with raised mouth angle, closed eyes and slightly open mouth. FIG. 8D represents a delighted expression with raised mouth angle and closed eyes, but widely open mouth.

According to one embodiment, the head mounted display apparatus recognizes the expression through the expression information around the eyes by a sensing unit including a light emitter and a light receiver positioned in the around of the eyes to recognize the expression. Said apparatus recognizes more accurately expressions by combining the expression information around the eyes and the expression information around the mouth after recognizing the expression information around the mouth.

As described above, according to the embodiment of the present invention, more accurate expression recognition is achieved by simultaneously measuring the expression information around the eyes and expression information around the mouth.

Figure 9:
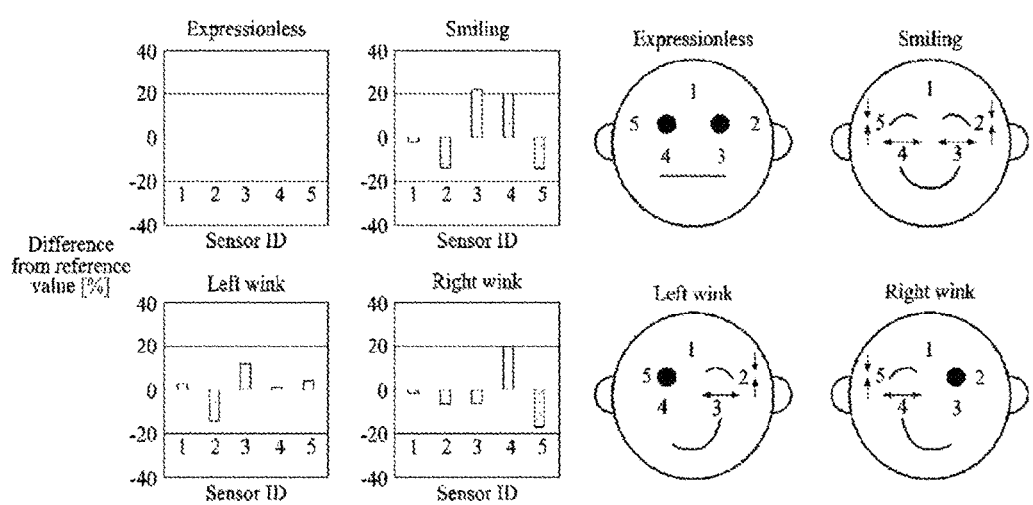
FIG. 9 is a graph showing a difference in measured value according to an expression measured by a sensing unit positioned at feature points for recognizing expressions according to an embodiment of the present invention.

FIG. 9 is a graph showing variation in measured values according to the expression recognized by a sensing unit positioned at feature points for recognizing the expression according to an embodiment of the present invention.

Referring to FIG. 9, the positions 1, 2, 3, 4, and 5 are randomly arranged on the face having an expression and these show the example of the feature points for facial expression recognition. For example, at the position corresponding to the feature point of the expressionless state, the value of the infrared intensity information according to change in tensile strength per expression is not measured. At the positions 2, 3, 4 and 5 corresponding to feature points of the smiling state, the value of the infrared intensity information according to change in the tensile strength per expression is measured.

In left eye winking, the value of the infrared intensity information according to change in the tensile strength is measured at points 2 and 3 around the left eye. In right eye winking, the values of the infrared intensity information according to change in tensile strength are measured at points 4 and 5 around the right eye.

According to one embodiment, the head mounted display apparatus may recognize an expression through a measurement value in accordance with change in tensile strength of each expression measured by a sensing unit located at a position corresponding to a feature point.

Figure 10:
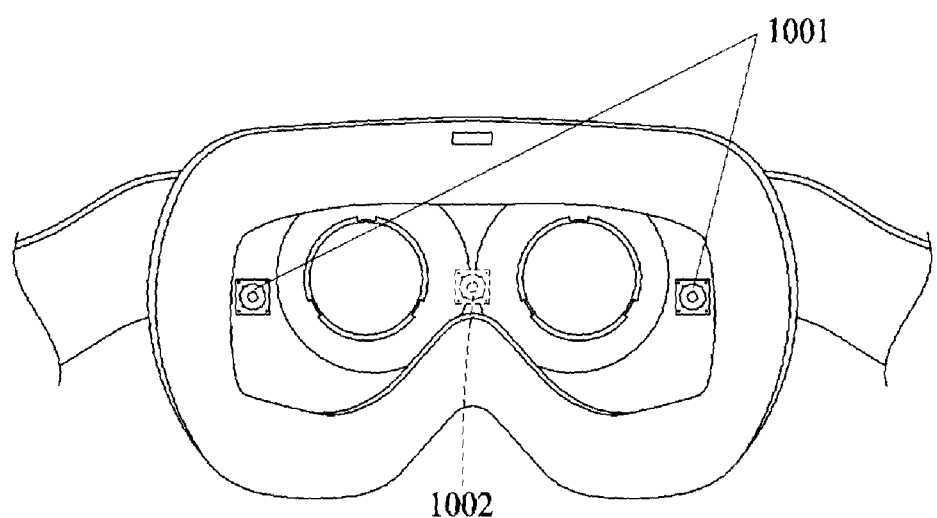
FIG. 10 shows an image sensing unit installed inside of the head mounted display apparatus according to an embodiment of the present invention.

FIG. 10 shows an image sensing unit installed inside of the head mounted display apparatus according to an embodiment of the present invention.

FIG. 10 shows, according to one embodiment, the first image sensing unit 1001 installed in a non-contact manner on both sides of an inner portion of the head mounted display apparatus or the second image sensing unit 1002 installed in a non-contact manner in a middle portion of an inner side of the head mounted display apparatus.

According to one embodiment, the first image sensing unit 1001 is disposed on both sides of the inner portion of said apparatus, and is used as a non-contact type light receiver that does not contact any one of the objects.

In addition, the first image sensing unit 1001 may be a camera capturing near-infrared (NIR) images.

In addition, the first image sensing unit 1001 is installed and may be detected in predetermined distance on non-contacting with any one object, for the aspect that the infrared light emitted from the light emitter in contact with any one object is diffused and transmitted through the skin.

Further, when the first image sensing unit 1001 is used as a non-contact type light receiver, the intensity of infrared light transmitted from the skin surface of the object is measured at almost part of around the eyes and the contactable specific position.

In addition, the expression may be recognized by analyzing the compression or stretching of each skin part including any one object, from change in the contour shape connecting the points representing the same infrared intensity value.

According to another embodiment, the second image sensing unit 1002 may be disposed in the center of the inner portion of said apparatus, and may be used as a non-contact type light receiver that does not contact any one object.

In addition, the second image sensing unit 1002 may be a camera capturing near-Infrared (NIR) images.

The expression recognition of the user may be performed based on the expression information of the user photographed through the first image sensing unit 1001 or the second image sensing unit 1002.

Figure 11:
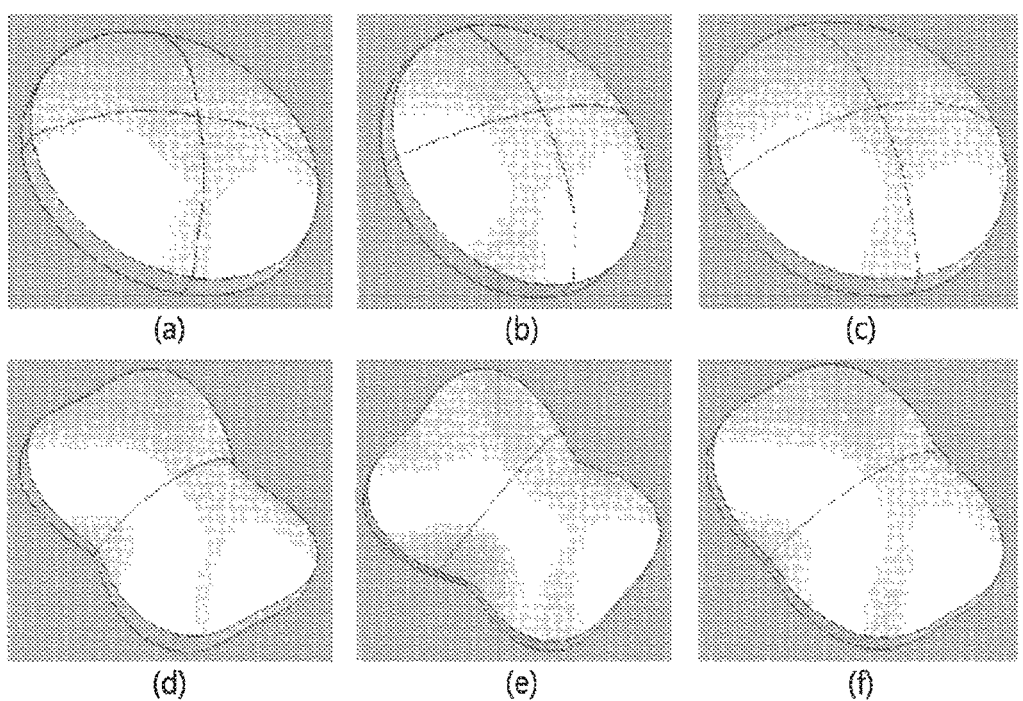
FIG. 11 shows the various embodiments of a fish-eye lens mounted on an image acquiring unit.

(a) to (f) of FIG. 11 are views of the various embodiments of a fish-eye lens mounted on an image acquiring unit.

The image acquiring unit may acquire the three-dimensional image information around the mouth.

For this purpose, the image acquiring unit may include lenses having various angles of view such as a telephoto lens, a normal lens, a wide-angle lens, and a fish-eye lens.

For example, the image acquiring unit may include a wide-angle lens having an angle of view of 180 degrees or more. Particularly, the image acquiring unit may apply the fish-eye lens 21 as for one of the wide-angle lens.

As shown in (a) to (f) of FIG. 11, the image acquiring unit may collect a changed expression around a wide mouth using the fish-eye lens 21 which has a wide angle of view compared to a standard lens.

The fish-eye lens 21 may have various sizes and shapes such as a dome shape and a ribbon shape as shown in from (a) to (f) in FIG. 11.

The fish-eye lens 21 is not fixed to one side of the image acquiring unit and may be replaceable.

Figure 12:
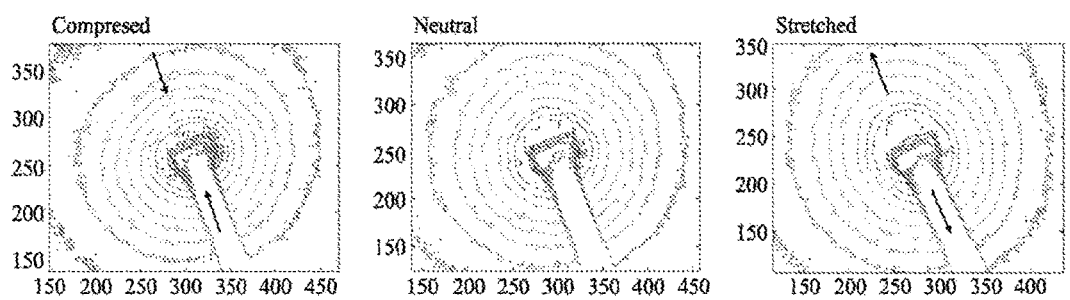
FIG. 12 shows a propagation pattern of infrared light photographed through an image sensing unit of the head mounted display apparatus according to an embodiment of the present invention.

FIG. 12 shows an infrared propagation pattern photographed through an image sensing unit of a head mounted display apparatus according to an embodiment of the present invention.

Referring to FIG. 12, there is shown a propagation pattern based on infrared intensity, which is differently sensed according to the compressed or stretched state of the skin surface of any one object through an NIR image sensing unit in a non-contact manner.

For example, an image sensing unit (e.g., a camera) may be configured to transmit a pattern of IR propagation to an image sensing unit (e.g., a camera) in the case of a neutral state in which one object does not contract or relax.

For this purpose, the image sensing unit may measure a pattern of IR propagation having a contour shape in which a plurality of concentric circles having a circle shape is gradually disposed from a light source located at the center.

When an object is compressed, the image sensing unit may photograph the pattern of IR propagation.

For this purpose, the image sensing unit may measure a pattern of IR propagation having a contour shape, in which a plurality of ellipses, which has an elliptical shape in a direction different from a direction to which the compressive force is applied in both sides of the circle from the outside of the circle, is gradually disposed from a light source positioned at the center.

When the object is stretched, the image sensing unit may photograph a pattern of IR propagation by an image sensing unit (e.g., a camera).

For this purpose, the image sensing unit may measure a pattern of IR propagation having a contour shape, in which a plurality of ellipses, which has an elliptical shape in both directions to which a tensile force of a circle is applied, is gradually disposed from a light source positioned at the center.

Embodiments of the present invention can include a computer readable medium including program commands for executing operations implemented through various computers. The computer readable medium can store program commands, data files, data structures or combinations thereof. The program commands recorded in the medium may be specially designed and configured for the present disclosure or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler, high-level language code executable by a computer using an interpreter, and the like. The hardware devices may be configured to operate as one or more software modules to perform operations in the embodiments, and vice versa.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. For example, proper results may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

Therefore, other implementations, other embodiments, and equivalents to the claims are within the scope of the following claims.

DESCRIPTION OF SYMBOLS

100: Head mounted display apparatus
110: Sensing unit
120: Image acquiring unit
130: Acquisition unit for information of expressions
140: Processing unit for recognition of expressions
202: Object
210: Light emitter
220: Light receiver
500: Feature points
701: Compressed
702: Normal(reference)
703: Stretched

What is claimed is:

1. A head mounted display apparatus for recognizing expressions, comprising:
    a sensing unit including at least one expression detection sensing unit installed inside of the head mounted display apparatus for sensing expression information around eyes in at least one of a contact manner and a non-contact manner;
    an image acquiring unit installed outside of said head mounted display apparatus for collecting expression information around a mouth; and
    an acquisition unit for information of expressions for collecting the expression information around the eyes and the expression information around the mouth,
    wherein the sensing unit measures a reference value of compression and stretching of one object and senses a degree of the compression of the one object or a degree of the stretching of the one object by comparing an infrared intensity value measured for the one object with the reference value, and
    wherein the degree of the compression of the one object or the degree of the stretching of the one object is reflected in the expression information around the eyes.

2. The head mounted display apparatus according to claim 1, further comprising:
    a processing unit for recognition of expressions for recognizing specific expressions based on the expression information around the eyes and the expression information around the mouth.

3. The head mounted display apparatus according to claim 1, wherein the expression detection sensing unit comprises an IR sensing unit having at least one of a contact type light emitter, a contact type light receiver and a non-contact type light receiver.

4. The head mounted display apparatus according to claim 3, wherein the expression detection sensing unit comprises a near-infrared image sensing unit.

5. A head mounted display apparatus for recognizing expressions, comprising:
    a sensing unit including at least one expression detection sensing unit installed inside of the head mounted display apparatus for sensing expression information around eyes in at least one of a contact manner and a non-contact manner;
    an image acquiring unit installed outside of the head mounted display apparatus for collecting expression information around a mouth; and
    an acquisition unit for information of expressions for collecting the expression information around the eyes and the expression information around the mouth,
    wherein said sensing unit measures a difference in an infrared diffusion in a horizontal direction and a vertical direction depending on a skin tensile strength through a light emitter and a light receiver.

6. The head mounted display apparatus according to claim 3, wherein expression detection sensing units are installed at positions corresponding to a plurality feature points in the around of the eyes.

7. The head mounted display apparatus according to claim 1, wherein the image acquiring unit includes a plurality of image acquiring units, and a photographing angle of the image acquiring unit is set in consideration of acquisition of three-dimensional image information in the around the mouth.

8. A method for recognizing expression in a head mounted display apparatus, comprising:
sensing expression information around eyes in at least one of a contact manner and a non-contact manner through at least one of expression detection sensing units installed inside of the head mounted display apparatus;
collecting expression information around a mouth through an image acquiring unit installed outside of the head mounted display apparatus; and
collecting the expression information around the eyes and the expression information around the mouth,
wherein the collecting the expression information around the mouth includes measuring a reference value of compression and stretching of one object and sensing a degree of the infrared intensity value measured for the one object with the reference value, and
wherein the degree of the compression of the one object or the degree of the stretching of the one object is reflected in the expression information around the eyes.

9. The method for recognizing expression according to claim 8, further comprising:
recognizing a specific expression based on the expression information around the eyes and the expression information around the mouth.

10. The method for recognizing expression according to claim 9, wherein the expression information around the eyes is sensed through an IR sensing unit having at least one of a contact type light emitter, a contact type light receiver and a non-contact type light receiver.

11. The method for recognizing expression according to claim 10, wherein information of expressions is sensed through a near-infrared image sensing unit.

12. A method for recognizing expression in a head mounted display apparatus, comprising:
sensing expression information around eyes in at least one of a contact manner and a non-contact manner through at least one of expression detection sensing units installed inside of the head mounted display apparatus;
collecting expression information around a mouth through an image acquiring unit installed outside of the head mounted display apparatus; and
collecting the expression information around the eyes and the expression information around the mouth,
recognizing a specific expression based on the expression information around the eyes and the expression information around the mouth,
wherein the expression information around the eyes is sensed through an IR sensing unit having at least one of a contact type light emitter, a contact type light receiver and a non-contact type light receiver,
wherein information of expressions is sensed through a near-infrared image sensing unit, and
wherein the method comprises a step of measuring a difference in the infrared diffusion in at least two directions depending on a skin tensile strength through a light emitter and a light receiver.

13. The method for recognizing expression according to claim 12, wherein the at least two directions comprise a horizontal direction and a vertical direction, and
wherein the expression information around the eyes is sensed through expression detection sensing units installed at positions corresponding to a plurality feature points around the eyes.

14. The method for recognizing expression according to claim 13, wherein the image acquiring unit includes a plurality of image acquiring units and a photographing angle of said image acquiring unit is set in consideration of acquisition of three-dimensional image information around the mouth.

* * * * *